Figure 1:
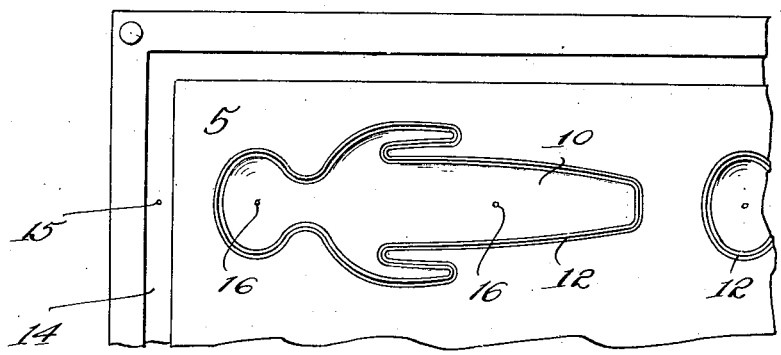

Dec. 28, 1926.

F. T. ROBERTS

METHOD OF MAKING HOLLOW RUBBER ARTICLES HAVING WHISTLES

Filed Dec. 14, 1923  2 Sheets-Sheet 1

INVENTOR
Fred Thomas Roberts
By Bakis & Macklin
ATTORNEYS

Dec. 28, 1926.  1,612,651
F. T. ROBERTS
METHOD OF MAKING HOLLOW RUBBER ARTICLES HAVING WHISTLES
Filed Dec. 14, 1923    2 Sheets-Sheet 2
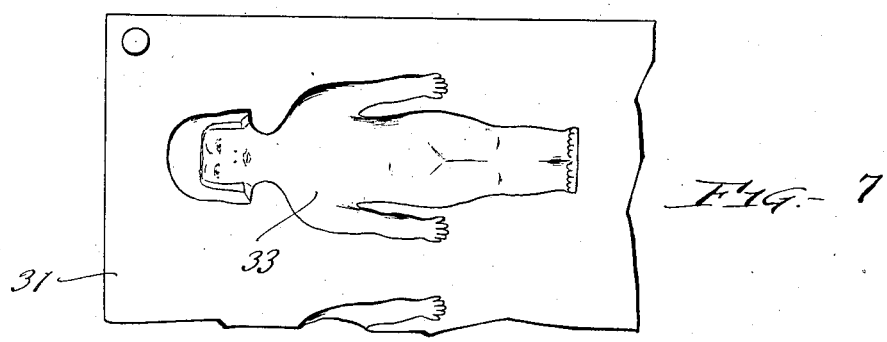
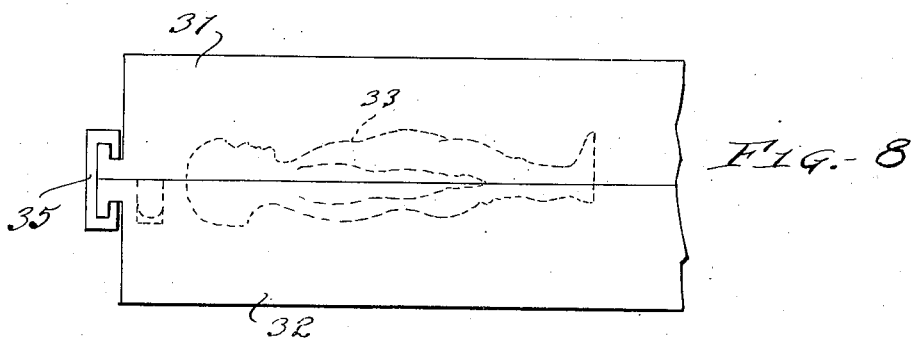
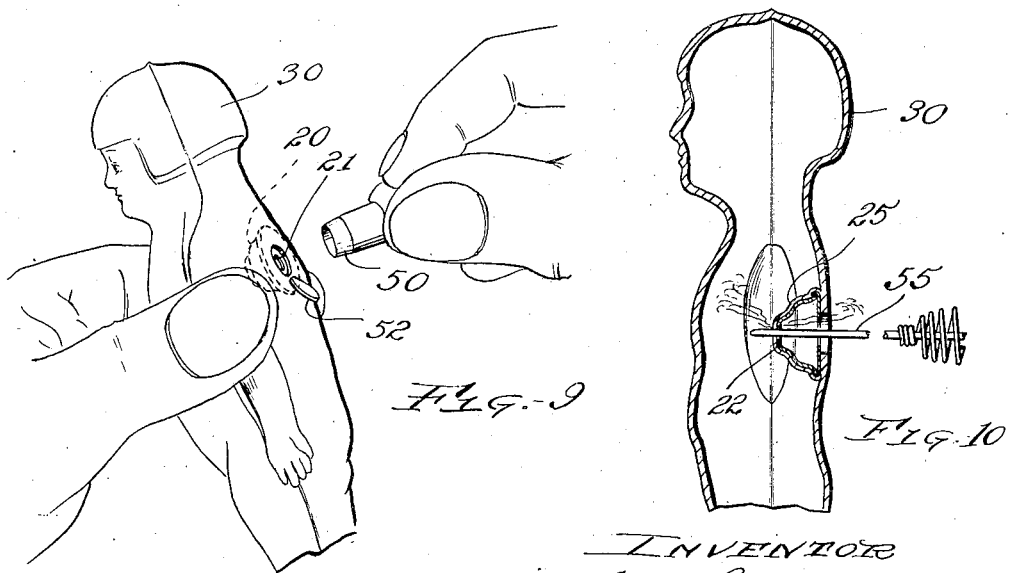

Patented Dec. 28, 1926.

1,612,651

UNITED STATES PATENT OFFICE.

FRED THOMAS ROBERTS, OF YONKERS, NEW YORK, ASSIGNOR TO PARAMOUNT RUBBER CONSOLIDATED INC., OF TUCKAHOE, NEW YORK, A CORPORATION OF DELAWARE.

METHOD OF MAKING HOLLOW-RUBBER ARTICLES HAVING WHISTLES.

Application filed December 14, 1923. Serial No. 680,708.

This invention relates to the manufacture of hollow rubber articles in which are used metal devices, such as whistles, ferrules, and the like, and it is particularly applicable for toys for small children, such as rubber dolls which are provided with a whistle, caused to sound by compressing the article to force air through the whistle. The difficulties heretofore encountered are in applying the whistle to the doll after it is finished. It is usually necessary to insert the whistle by hand into the finished article, whereas small children frequently accomplish the removal of the whistles and sometimes swallow them.

The method of the present invention is to so embed the whistle or the like, into the article when it is formed as to eliminate this danger by making it practically impossible to remove the whistle. Other objects of the invention are to provide for the simple attachment of the whistle to the inside of the article during the manufacture of it, and to render the whistle operative after the article is completed.

My invention is shown in the accompanying drawings as applied to a hollow rubber doll. Other objects and advantages will become apparent in the following description relating to the drawing and the essential characteristics are set forth in the claims.

Figure 2:
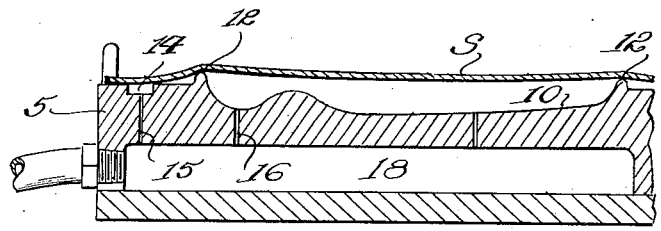
Figure 4:
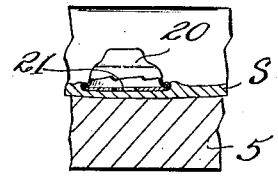
Figure 3:
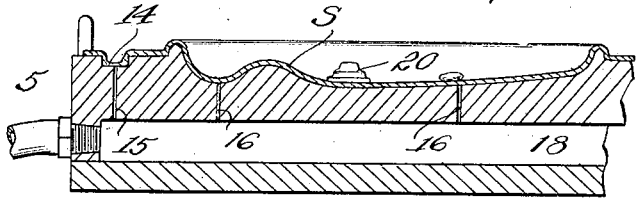
Figure 5:
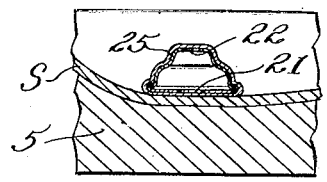
Figure 6:
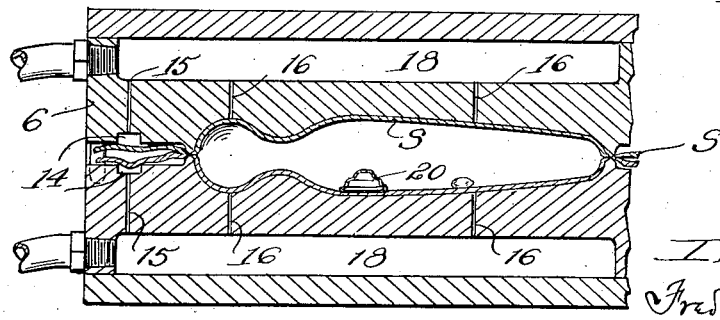

Fig. 1 is a plan view of a portion of the mould member, such as may be used in the manufacture of such articles; Fig. 2 is a cross section of the same showing the sheet of rubber in position to be seated in the cavity thereof; Fig. 3 is a similar view showing the rubber seated in the cavity; Figs. 4 and 5 are enlarged detail sections showing alternative methods of securing the whistle to the wall of the article while in the mould cavity and before closing the article; Fig. 6 is a vertical section showing the mould parts brought together forming a blank for the article with the whistle or like attachment in position; Fig. 7 is a plan of the vulcanizing mould in which the blank is forced by internal pressure into final shape; Fig. 8 is a side elevation showing in broken lines the position of the cavity of the mould members when brought together; Fig. 9 is a perspective view of the whistle; Fig. 10 is a sectional view illustrating the method of removing the rubber from the inner opening in the whistle.

As stated, it is an essential thought of the present invention to secure the whistle or like object to the inside of the wall of an article formed in parts which are later brought together to complete the article. The method of forming the parts of the article may be any of the number of well known commercial methods, but I prefer to form a blank by the use of mould members 5 and 6 shown in Figs. 1, 2, 3, and 6, where cavities 10 roughly outlining the doll to give an approximate shape of head, body, and arms, are provided. The mould member is shown as being in the nature of a plate provided with knife edges 12 surrounding the cavities to cause a uniting of the rubber stock and a severing of the blank within the cavities from the surrounding sheet. A groove surrounding the several cavities in each mould member is indicated at 14. This groove and the cavities are connected by small passages 15 and 16, respectively, with a vacuum chamber 18, whereby the sheet stock is clamped around the edges and drawn into the mould cavities by pneumatic pressure. When the stock indicated at 5, is so seated, the whistle or like article is secured thereto. In the drawing 20 designates a whistle consisting of a hollow body form having a flat side and a convex side joined together and having opposite openings 21 and 22, whereby the passage of air may cause a whistling noise. This whistle may be pressed into the plastic rubber and even to somewhat actually embed itself slightly therein. Thus, it is caused to firmly adhere and remain securely in position, consequent upon vulcanization. This is illustrated in Fig. 4.

Another method is illustrated in Fig. 5 to more securely hold the whistle or other article in position by placing a surrounding sheath of plastic rubber over the whistle and extending it across the surface to be placed adjacent the wall of the article. If this coating is of plastic rubber or the like, it will become vulcanized to the wall of the article and thus secure the whistle in position. This coating, it should be understood, may underlie the engaging surface at the whistle and may be curled only a slight distance over the edge to hold it in place. The coating is designated at 25 and is shown as extending underneath the whistle, and this portion is pressed against the rubber wall of the article to which it adheres until vulcanization.

In either case, after the whistle is placed in position, the two parts of the article in opposing mould cavities are brought together and joined, and severed from the surrounding sheets by the knife edges, in the fashion illustrated in Fig. 6. Before bringing the parts together, a suitable material such as a pellet of powdered ammonia is placed therein to create internal pressure, consequent upon subjection to the vulcanizing temperature.

The hollow blank is then placed within the cavities 33 of the vulcanizing mould, such as shown at 31 and 32 in Figs. 7 and 8, which are secured together by any suitable means, such for example as by a clamp indicated at 35. The walls of the article are caused to flow and accurately fit the lines of the finished form cavities, thus producing the features, fingers, etc., of the doll.

After removal of the doll 30 from the vulcanizing mould, the whistle opening 21 may be exposed by cutting away a portion of the rubber directly over the outer opening thereof. The wall of the doll being flexible facilitates location of the whistle for this purpose by squeezing it between the thumb and forefinger, as indicated in Fig. 9, and when so located, a circular cutter designated 50 may by a slight turning and pressing motion, be caused to remove the rubber from over and around the opening of the whistle. The cut away piece 52 is preferably slightly larger than the whistle opening.

In case of the use of the form where the whistle has a coating 25 over it, this may be cut away from this inner opening 22 by the use of a punch or a hot pin or needle, thrust therethrough after uncovering the outer opening in the manner described. Such a burning or cutting tool is indicated at 55 in Fig. 10.

It will be seen that by the use of the present invention, the whistle is securely held on the inside of the wall of the article and that it will be difficult, in fact, impossible to remove it. Therefore, the article as an operative device will last indefinitely, whereas when such whistles are removed from toys of this character as was possible formerly, the toys at once lost their attraction.

While the description relates to the embodiment of a whistle in a hollow article, it will be seen that it may be used for ferrules, nipples, etc., for various hollow articles. As stated, the article may be made by many well known methods, I prefer, however, to use that illustrated, and for a fuller description of that process, reference may be made to my prior Patent No. 1,346,848, granted July 20th, 1920.

Having thus described my invention, what I claim is:—

The method of making hollow rubber articles of the character described, comprising seating sheet stock for the parts of the article in mould cavities, embedding a whistle or like member having a substantially flat outer face in one of the seated sheets, placing a heat expanding substance in one of the rubber lined cavities, thereafter bringing the mould members together to join the article, then vulcanizing it in a mould with internal fluid pressure, and thereafter forming an opening through the wall of the article opposite the whistle or like member.

In testimony whereof, I hereunto affix my signature.

FRED THOMAS ROBERTS.